(12) United States Patent
Assmus et al.

(10) Patent No.: US 8,436,938 B1
(45) Date of Patent: May 7, 2013

(54) DEVICE AND METHOD FOR RECEIVING DATA TRANSMITTED BY MEANS OF AN ASYNCHRONOUS DATA TRANSMISSION TECHNIQUE

(75) Inventors: Ulf Assmus, Darmstadt (DE); Michael Roth, Berlin (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/355,149

(22) PCT Filed: May 26, 1998

(86) PCT No.: PCT/EP98/03086
§ 371 (c)(1),
(2), (4) Date: Mar. 7, 2000

(87) PCT Pub. No.: WO98/56126
PCT Pub. Date: Dec. 10, 1998

(30) Foreign Application Priority Data

Jun. 6, 1997 (DE) .................................. 197 23 760

(51) Int. Cl.
| | |
|---|---|
| *H04N 7/00* | (2011.01) |
| *H04N 11/00* | (2006.01) |
| *H04N 9/475* | (2006.01) |
| *H04L 25/38* | (2006.01) |
| *H04L 7/00* | (2006.01) |
| *H04L 12/28* | (2006.01) |
| *H04L 12/56* | (2006.01) |
| *H04J 3/06* | (2006.01) |

(52) U.S. Cl.
USPC ...... 348/497; 348/518; 370/516; 370/395.62; 375/370; 375/371

(58) Field of Classification Search .................. 348/518, 348/500–506, 497; 375/372, 364, 226, 371, 375/356, 254; 370/500–506, 516, 508, 517, 370/395.6, 395.61, 395.62
See application file for complete search history.

(56) References Cited

U.S. PATENT DOCUMENTS

| | | | | |
|---|---|---|---|---|
| 5,222,108 | A | * | 6/1993 | Suzuki ........................... 375/372 |
| 5,396,492 | A | * | 3/1995 | Lien ............................... 370/412 |
| 5,652,627 | A | * | 7/1997 | Allen ............................. 348/497 |
| 5,703,877 | A | * | 12/1997 | Nuber et al. ............. 370/395.64 |

(Continued)

FOREIGN PATENT DOCUMENTS

EP          0 374 794          6/1990

OTHER PUBLICATIONS

H. Hessenmueller et al., "High-Quality Video and Audio Signal Transmission in a Broadband ISDN Based on ATD", EBU Review-Technical, Nr. 247, Jun. 1, 1991, pp. 124-131.

(Continued)

*Primary Examiner* — Michael Lee
(74) *Attorney, Agent, or Firm* — Kenyon & Kenyon LLP

(57) ABSTRACT

A device is described for receiving data transmitted using asynchronous data transmission technology, in particular audio and video data, which receives a clock signal, having a memory device (17), which stores the received data for the required period of time in order to compensate for transmission delays (Cell Delay Variation). The clock signal is sent to the memory device (17) for reading out the data. Furthermore, a method is described for receiving data signals using asynchronous data transfer technology, with the received data signals being temporarily stored and read out at the studio clock rate.

9 Claims, 3 Drawing Sheets

U.S. PATENT DOCUMENTS 5,870,087 A * 2/1999 Chau .............................. 715/202
5,896,427 A * 4/1999 Muntz et al. .................. 375/372

OTHER PUBLICATIONS

Cochennec et al., "Asynchronous Time-Division Networks: Terminal Synchronization for Video and Sound Signals", Globecom, New Orleans, Dec. 2-5, 1985, vol. 2 , pp. 791-794, Institute of Electrical and Electronic Engineers.

Abate et al., "AT&T's New Approach to the Synchronization of Telecommunication Networks", IEEE Communications Magazine, Bd. 27, Nr. 4, Apr. 1989, pp. 35-45.

* cited by examiner

DEVICE AND METHOD FOR RECEIVING DATA TRANSMITTED BY MEANS OF AN ASYNCHRONOUS DATA TRANSMISSION TECHNIQUE

The present invention relates to a device for receiving data transmitted using asynchronous data transmission technology, in particular audio and video data, which receives clock signal, having a memory device. The invention furthermore concerns a method of transmitting and receiving data signals, in particular audio and video signals, between two studios with each studio having a studio clock rate.

Studio in this context is understood as a system having means for processing audio and video data signals. Studios increasingly process data digitally, for which the processing means must be supplied with a common clock rate. When data is transmitted between two studios, for example, the studio clock rates must be synchronized to avoid disturbances that occur due to losses in receiving and further processing data.

Studio clock rates can be synchronized, for example, in a method known as master/slave synchronization in that a studio, as the master, provides a clock rate, which is then used by the other studio for synchronization of its own clock rate. Furthermore, according to another method, a common network operator, for example, may provide a clock rate to the studios connected to the network. In both of the above methods, the useful signal is normally used for synchronizing or transmitting the sync signal.

These methods, however, have the disadvantage that the signal used for synchronization must be transmitted without interference. If the signal has considerable jitter or wander, this interference has a direct effect on the studio clock rate derived therefrom. If the data signals are transmitted to the other studio having a jitter-free clock signal, bit errors and thus considerable disturbances in the analog signal occur. Jitter is understood here as high-frequency phase modulation of the clock signal, while wander is very low-frequency phase modulation of the clock signal. With increasing digital processing in studios, data between studios are also being transmitted in digital form, with the ATM (Asynchronous Transfer Mode) signal transmission method expected to be mainly used in the future. In this method, clock signal recovery takes place on the receiver side on the basis of the amount of data received per unit of time. In this case, a high-frequency jitter having a low, and therefore non-interfering, amplitude and a wander, based on the ATM principle, having a relatively high amplitude and very low frequency normally occur. Due to the low frequency (below the MHz range) of the wander, the technology used for eliminating jitter in the form of a PLL (Phase Locked Loop) circuit with extremely low-pass characteristics, is not suitable, since wander depends, among other things, on the varying load on the individual switching nodes of an ATM data transmission network. This wander, however, causes the signal to deteriorate considerably, resulting in audio signal crackling in more or less regular intervals, unless suitable countermeasures are used.

The object of the present invention is therefore to provide a device with which error-free reception of data, in particular of video and/or audio data, between two studios that are synchronized with one another, can be achieved.

This object is achieved using a device for receiving data transmitted by asynchronous data transmission technology having the features of claim 1.

By implementing a sufficiently large memory device in the transmitter, the data received are stored during a period required for compensating transmission delays, and by the studio clock signal being sent to the memory device for reading the data, wander resulting in disturbance can be compensated for or the period between two disturbances caused by wander can be made so long that the effect of the disturbances is reduced, especially if they occur during nighttime. In addition, the advantages of ATM technology, such as high data rate flexibility, the use of a public ATM network, the use of dial-up connections, no closed user classes in a special network, and no special network technology, are preserved. Another great advantage is that a single network allowing LAN-LAN (local area network) links and links between two switching stations for telephone traffic, in addition to audio and video links, can be implemented.

Advantageous embodiments of the invention are presented in the subclaims.

The use of the ATM technology is particularly advantageous for transmitting data. Of course, the invention can also be used in PDH (plesiochronous digital hierarchy) or with components of the SDH (synchronous digital hierarchy, SONET in the U.S.).

The use of a FIFO (first in first out) memory as the memory device is particularly advantageous, with the FIFO memory being sized so that data can be stored for a period of preferably n·150 µs. This period is obtained by the number of possible switching stations within a transmission link, with 100 µs per switching node to be assumed for a non-busy network and approximately 250 µs for a busy network.

When synchronizing two studios, one studio is preferably selected as the master, which transmits a clock signal to the other studio. In larger networks, this is also advantageous for causing the studio clock rates present in the network to be synchronized using a centrally generated standard clock rate.

If data are transmitted between non-synchronized studios, for example, when transmitting across national borders, a means is preferably provided that is designed to match the clock rate of the received data stream to the studio clock rate. To match the clock rate, the means detects the points in time when the digital signal distortion after digital-to-analog reconversion results in no significant signal deterioration. In an audio signal, this instant is detected when the state of pause (no signal) is detected in the signal over several samplings. In video applications the image boundaries are preferably detected and then entire images are omitted or read twice.

In a refinement of the present invention, a switchover device is provided, which classifies the data received over the network and forwards it to the respective receiver. Thus, for example, audio and video data signals represent a class and are forwarded to the studio for further processing. Telephone data signals, for example, represent another class and are sent to an associated telephone system. In addition, computer data belong to a class and are transmitted over a LAN and supplied to the respective network by the switchover device. The switchover device preferably also performs bundling of the different data signals.

Due to the fact that the data signals are transmitted using an asynchronous data transmission technology and the received data signals are stored and read at the studio clock rate, disturbances are avoided or reduced to the point where they are no longer relevant.

Other advantageous embodiments of the method are derived from the subclaims.

The invention is now explained in more detail with reference to the embodiments illustrated in the drawing.

Figure 1:
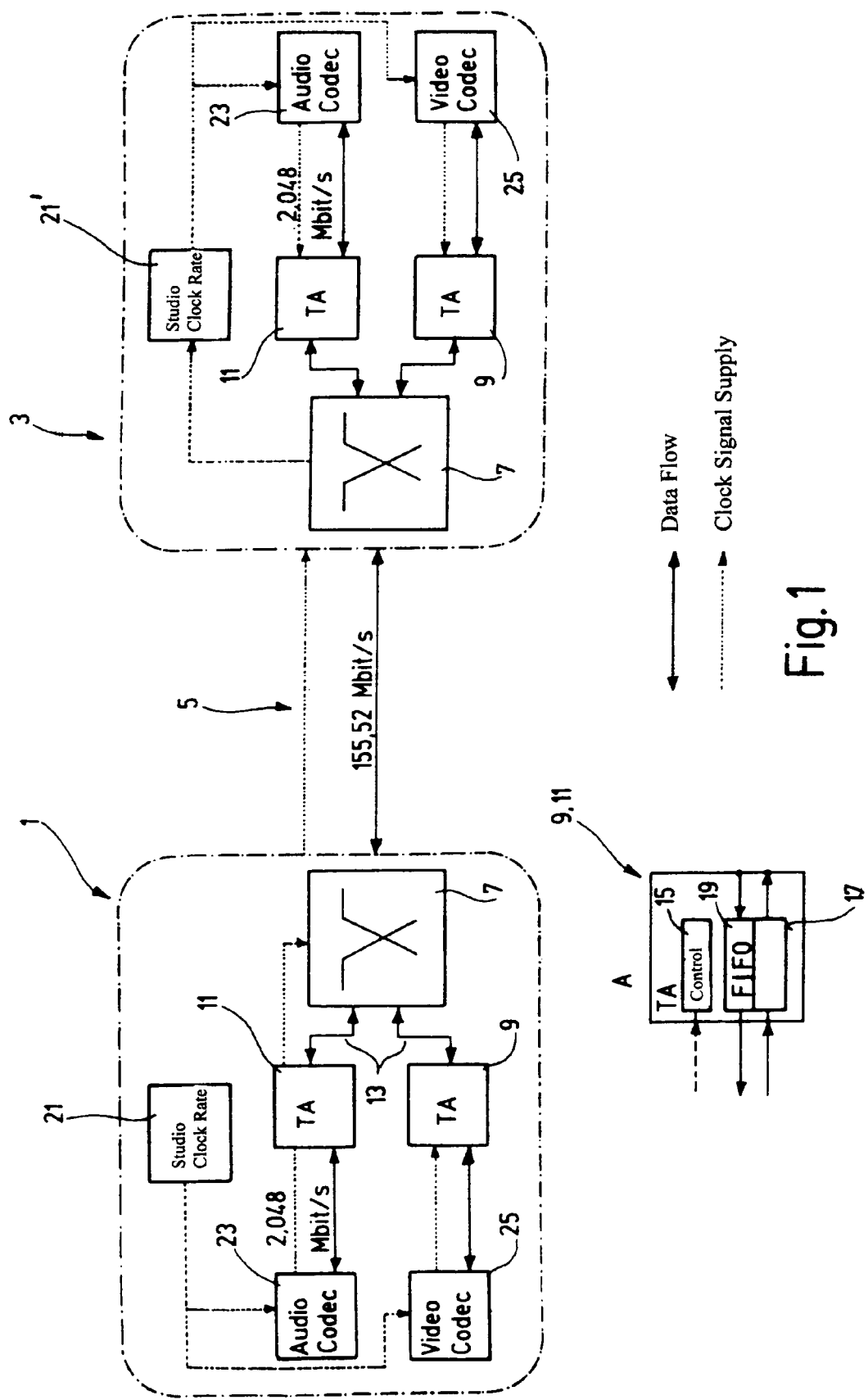
FIG. 1 shows a block diagram of the layout of two studios and the link between them.

FIG. 1 schematically shows a device 1, connected to another device 3 of basically the same structure via link 5. Both devices are devices for processing digital data, namely digital audio and video data, which are used in radio and TV technology. Such devices 1, 3 are components of digital radio or TV studios. In the following, for the sake of simplicity, both devices 1 and 3 will be referred to as studios. The function of such a studio is, for example, to process, in real time, the data of a live transmission transmitted by another studio and to transmit this data to the viewers via terrestrial or wire-bound transmission channels.

In order to digitally process such data, studio 1 has a transmitter 7, which is connected to transmission link 5 on the receiver side. Transmitter 7 bundles different data streams, for example, audio and video data streams, using the multiplex method, for example, to transmit these streams to transmission link 5 via a common conductor. The data transmission link may be an STM1 link with a data transmission rate of 155.52 Mbit/s. Another function of transmitter 7 is to convert the data signals to be transmitted into the form required for transmission. According to the present invention, the ATM method (asynchronous transfer mode) is used as the transmission method. Since this method is known per se, it shall not be described in detail here.

Furthermore, in this embodiment, transmitter 7 separates the data stream received into an audio data stream and a video data stream, while unpacking the data packets.

Two devices, hereinafter referred to as terminal adapters 9, 11, are connected to transmitter 7 via data lines 13. In the present embodiment, terminal adapter 9 is assigned to the video data stream, while terminal adapter 11 is assigned to the audio data stream. The terminal adapters are used to adapt the data coming from transmitter 7 to the form required within studio 1, which normally also includes the recovery of the clock rate used on the transmitter side. Terminal adapters 9 and 11 must divide the data stream into individual data packets, known as ATM cells, for ATM technology transmission, with each data packet containing control information in addition to the actual useful data. An ATM cell normally has 53 bytes.

Such a terminal adapter includes, as schematically illustrated in detail A of FIG. 1, a control unit 15 and a memory unit 17. This memory unit includes at least one area 19 operating as a FIFO (first in first out) memory, which receives the data coming from transmitter 7. Control unit 15 is responsible for the readout of data from the FIFO memory 19 at a clock rate that is provided by a clock 21 provided in studio 1. This clock rate is hereinafter referred to as the studio clock rate. Thus, the function of FIFO memory 19 is to temporarily store a certain amount of data. The size of the FIFO memory is determined by the data transmission rate and by the number of switching nodes present in the transmission link. It has been shown that for a transmission rate of 34 Mbit/s, the memory may have 300 ATM cells, and for a transmission rate of 8 Mbit/s, it may have 100 ATM cells. This results in a memory size of 13 ATM cells per 1 Mbit/s data transmission rate. FIFO memory 19 should also be dimensioned so that the transmission technology-related time delays are compensated for. Thus, delays known as Cell Delay Variation (CDV) occur due to the switching nodes in the transmission link, which cause a delay of 100 µs for a non-busy network node (switching node) up to 250 µs for a busy network node.

The data temporarily stored in FIFO memory 19 are then read out at the studio clock rate and sent to a downstream audio or video coder/decoder 23 or 25, respectively. In the present embodiment, the audio data are transmitted at a transmission rate of 2,048 Mbit/s, for example, to audio coder/decoder 23. For further data processing, coders/decoders 23, 25 also receive the studio clock rate from clock 21. Since the subsequent processing of the respective data is not relevant to the present invention, it will not be described here.

For the layout of studio 11 it is essential that terminal adapters 9, 11 receive the studio clock rate so that the received data are read from FIFO memory 19 at the studio clock rate. Thus, according to the present invention, no clock rate recovery from the received data stream takes place in the terminal adapter.

It is essential for error-free processing of the received data that the studio clock rate used for subsequent processing is synchronized with the clock rate used by the transmitter. In the present embodiment according to FIG. 1, the transmitter is studio 3, which has the same structure as studio 1. Therefore the parts identified with the same reference symbols are not described again.

In this embodiment, studio clock rate 21 of studio 1 is transmitted to studio 3 via transmission link 5 for synchronization. In selecting the transmission channel, it must be ensured that the clock signal is transmitted with the highest priority with the least possible interference. In studio 3, this clock signal is transmitted from transmitter 7 to clock generator 21' and is used there for the synchronization of the studio clock signal that has been generated. This type of synchronization is known as master/slave synchronization with studio 1 operating as the master and studio 3 operating as the slave.

The advantage of this type of data transmission is that the advantages of ATM technology, such as great data rate flexibility, the use of a public ATM network, use of dial-up links, no closed user class in a special network, no special network techniques, etc., are preserved without the need for taking into account the wander (synchronization losses), which is inherent in this ATM technology. Using high-capacity FIFO memory 19, interference caused by wander can be prevented or spread over time so that it only occurs at night.

Figure 2:
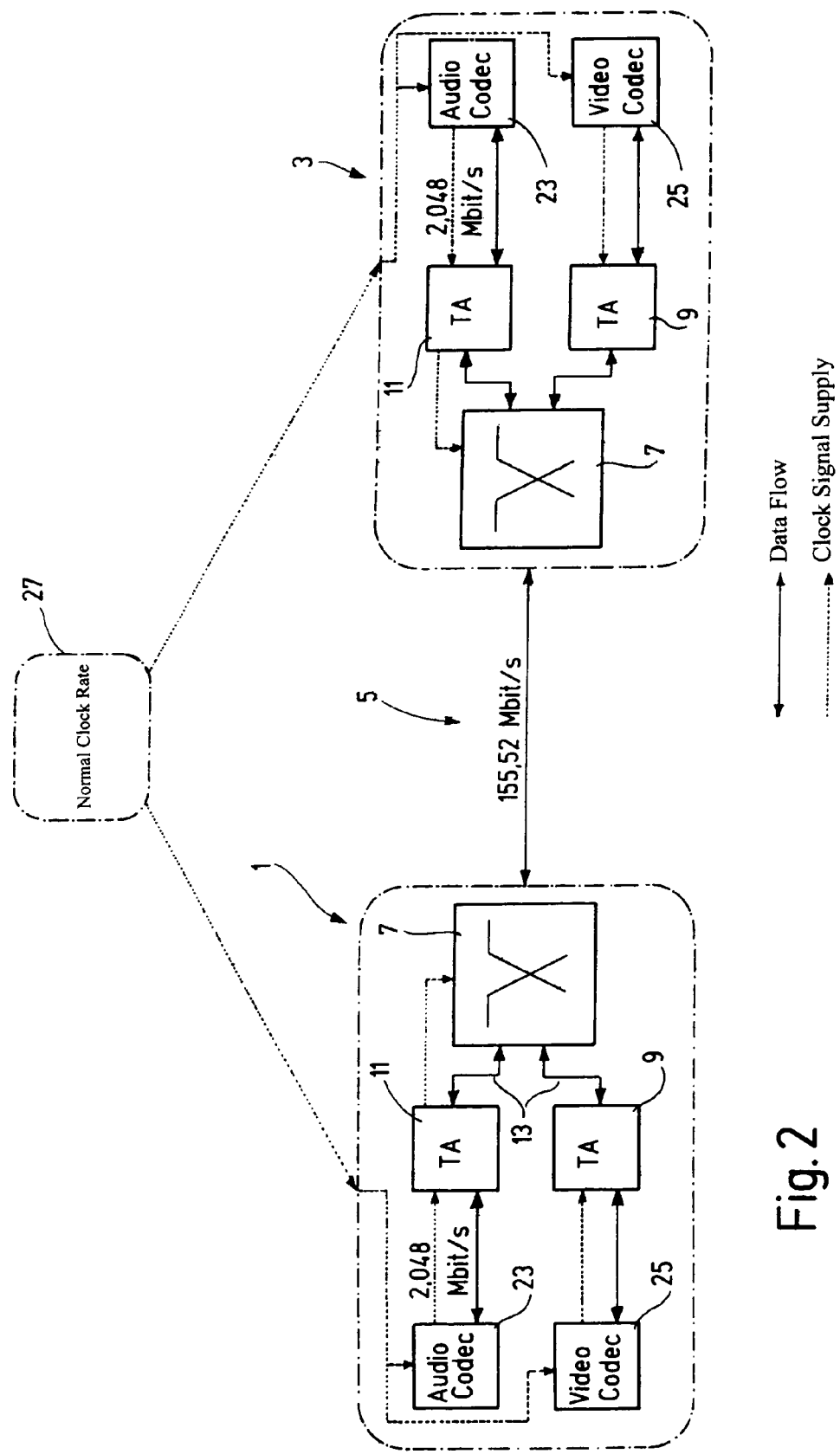
FIG. 2 shows a block diagram of the link between two studios with a normal clock rate supply.

Another type of synchronization of two studios 1, 3 is illustrated in FIG. 2. The two studios 1, 3 are identical to the studios described previously, so they will not be described again. The difference is that both studios do not necessarily have clocks 21 to be synchronized. Instead, a clock signal known as a normal clock rate is sent to them from a central clock, for example, of network operator 27 (which then may synchronize clocks 21 that are used).

Figure 3:
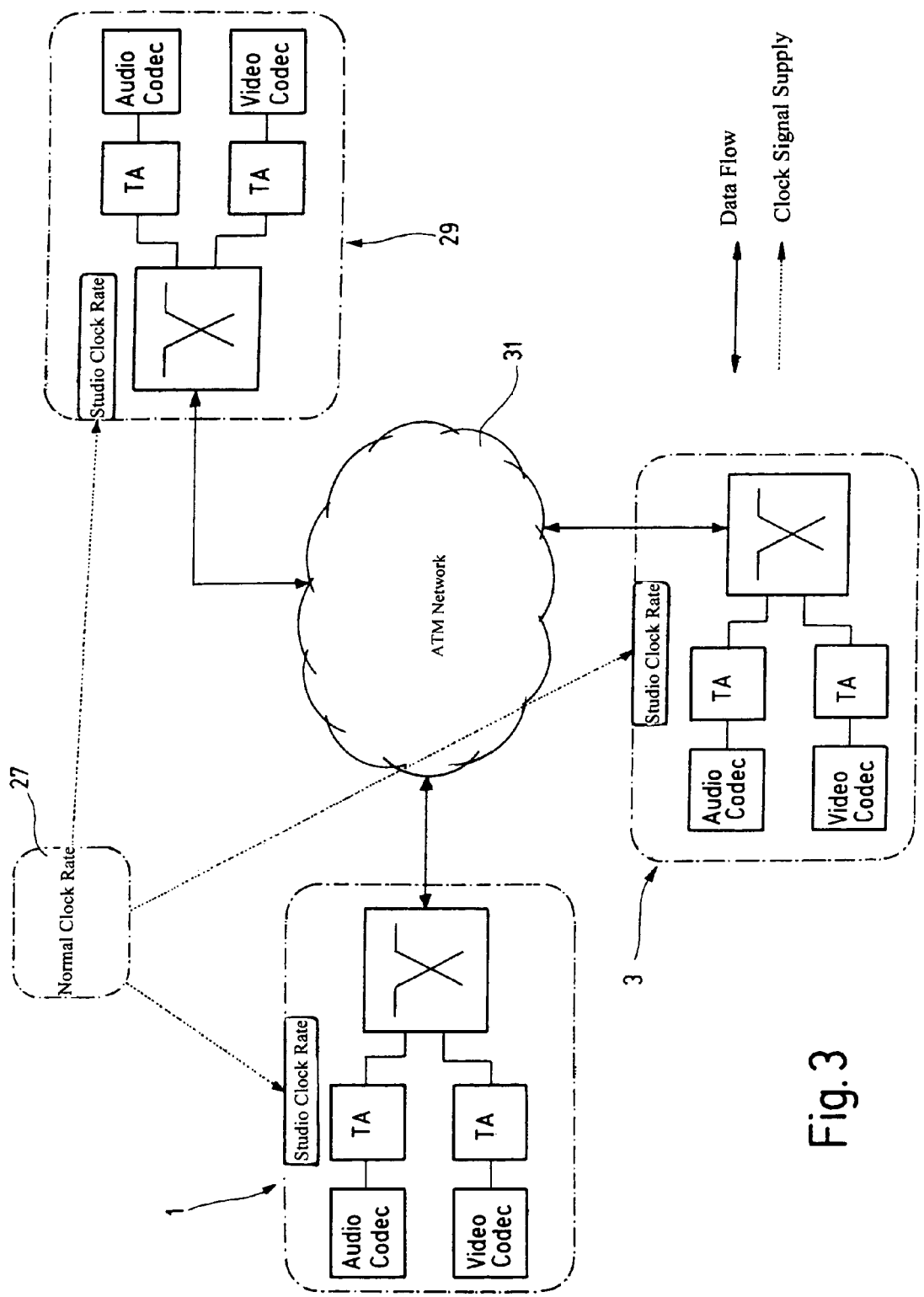
FIG. 3 shows a block diagram of several studios linked via a common network.

FIG. 3 shows another embodiment, where three studios 1, 3, 29 are connectable via a common ATM network 31. All three studios 1, 3, 29 have the same structure and are identical to the studio described with reference to FIG. 1. Therefore the part provided with the same reference symbols will not be described again. As elucidated in connection with FIG. 2, the clock rate required for synchronization is generated in this embodiment by a central clock 27 and made available to each studio 1, 3, 29, where it is used for synchronization of the studio clock rate.

ATM network 31 can be a public ATM network here, for example (hard-wired or dial-up). Due to the possibly greater CDV delay in data transmission, the FIFO memories of the terminal adapters must be adapted as needed.

In addition, each of transmitters 7 may be provided with a switchover unit, which allows data of different classes (audio/video data, telephone data, computer data) to be bundled and separated. Thus ATM network 31 can be used for different services.

Control unit 15 can also be equipped with means designed for adjusting the clock rate of the received data stream to the studio clock rate. In order to adjust the clock rate, the means detects points in time when distortion of the digital signal after digital-analog reconversion results in no significant signal deterioration. For an audio signal, this point in time is recognized, for example, when the pause (no signal) state is detected over several samplings. For video applications, the image boundaries are preferably recognized and then entire images are omitted or read twice. Thus data can also be transmitted between a synchronized and a non-synchronized studio.

CAPTIONS TO FIG. 1

15 control
21, 21' studio clock rate
A data flow
B clock signal supply
[Captions to FIG. 2]
27 normal clock rate
A data flow
B clock signal supply
[Captions to FIG. 3]
21 studio clock rate
27 normal clock rate
A data flow
B clock signal supply
D ATM network

The invention claimed is:

1. A device for receiving data transmitted using asynchronous data transmission technology, comprising:
 a data-independent clock signal;
 a memory device which stores the received data for the required period of time such that a period between two disturbances is made long so that any effect of the two disturbances is reduced, the memory device having sufficient memory to store a multitude of data and associated clock times; and
 a switchover device is provided, which classifies the received data into data classes and relays them to a corresponding device,
wherein the data-independent clock signal is sent to the memory device for readout of the received data.

2. The device according to claim 1, characterized in that the memory device is designed for receiving data transmitted by the ATM technology device and is designed as a FIFO memory.

3. The device according to claim 1, characterized in that the memory device is designed as a FIFO memory.

4. The device according to claim 3, characterized in that the FIFO memory is dimensioned so that the received data are storable for a period of 100 Φs to 250 Φs per switching node.

5. The device according to claim 1, characterized in that a clock providing a clock signal is synchronized with at least one other device.

6. The device according to claim 1, characterized in that the clock is not synchronized with the clock of the transmitting device, and means for adjusting the received data stream to the clock rate of the clock are provided.

7. The device according to claim 6, characterized in that the clock rate adjusting means effect one of doubles and omits certain data signals when reading from the memory device.

8. The device according to claim 1, characterized in that the clock is synchronized via an external normal clock rate.

9. The device according to claim 1, wherein the asynchronous data transmission technology is at least one of audio data and video data.

* * * * *